(12) United States Patent
Liu et al.

(10) Patent No.: US 12,276,799 B2
(45) Date of Patent: Apr. 15, 2025

(54) ILLUMINATION MODULE, HEAD-MOUNTED DISPLAY INCLUDING ILLUMINATION MODULE, AND METHOD FOR CREATING UNIFORM LIGHTING

(71) Applicant: Quanta Computer Inc., Taoyuan (TW)

(72) Inventors: Yun-Cheng Liu, Taoyuan (TW); Yi-Sheng Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 18/395,903

(22) Filed: Dec. 26, 2023

(65) Prior Publication Data
US 2025/0060590 A1    Feb. 20, 2025

(30) Foreign Application Priority Data
Aug. 17, 2023    (TW) .................................. 112130947

(51) Int. Cl.
*G02B 27/01*    (2006.01)
*F21V 8/00*    (2006.01)
*G02B 27/09*    (2006.01)

(52) U.S. Cl.
CPC ....... *G02B 27/0172* (2013.01); *G02B 6/0073* (2013.01); *G02B 6/0088* (2013.01); *G02B 27/0955* (2013.01); *G02B 2027/0112* (2013.01); *G02B 2027/0178* (2013.01)

(58) Field of Classification Search
CPC ..... G06F 3/013; G06F 3/017; G02B 27/0093; G02B 26/005; G02B 27/0172; G02B 27/01
See application file for complete search history.

(56) References Cited

U.S. PATENT DOCUMENTS

| | | | |
|---|---|---|---|
| 7,457,040 B2 * | 11/2008 | Amitai | G02B 27/1073 359/857 |
| 9,335,548 B1 * | 5/2016 | Cakmakci | G02B 27/0172 |
| 10,775,616 B1 * | 9/2020 | Ouderkirk | H01L 25/0753 |
| 2005/0180687 A1 * | 8/2005 | Amitai | G02B 27/286 385/31 |
| 2017/0115519 A1 * | 4/2017 | Shi | G02B 27/0172 |
| 2017/0255011 A1 * | 9/2017 | Son | G02B 5/3025 |

(Continued)

FOREIGN PATENT DOCUMENTS

| | | |
|---|---|---|
| CN | 212391676 U | 1/2021 |
| CN | 113508328 A | 10/2021 |

(Continued)

OTHER PUBLICATIONS

Chinese language office action dated May 7, 2024, issued in application No. TW 112130947.

*Primary Examiner* — Olga V Merkoulova
(74) *Attorney, Agent, or Firm* — McClure, Qualey & Rodack, LLP

(57) ABSTRACT

An illumination module is provided. The illumination module includes a light-emitting unit. The light-emitting unit includes a light-emitting element array and a focusing lens array. The light-emitting element array includes a plurality of light-emitting elements. The light-emitting elements are used for generating a plurality of light beams. The focusing lens array includes a plurality of focusing lenses. Each of the light-emitting elements corresponds to at least one of the focusing lenses.

10 Claims, 10 Drawing Sheets

(56) References Cited

U.S. PATENT DOCUMENTS

2017/0299860 A1\* 10/2017 Wall ........................ G02B 3/04
2019/0384064 A1\* 12/2019 Lee ......................... G06F 1/163
2021/0387261 A1\* 12/2021 Takeshita ............... B33Y 50/02
2022/0099975 A1\* 3/2022 Schultz ................ G02B 3/0062

FOREIGN PATENT DOCUMENTS

| CN | 216633000 | U | \* | 5/2022 | ......... G02B 27/0955 |
| CN | 116699855 | A | \* | 9/2023 | ......... G02B 27/0955 |

\* cited by examiner

ILLUMINATION MODULE, HEAD-MOUNTED DISPLAY INCLUDING ILLUMINATION MODULE, AND METHOD FOR CREATING UNIFORM LIGHTING

CROSS REFERENCE TO RELATED APPLICATIONS

This application claims priority of Taiwan Patent Application No. 112130947, filed on Aug. 17, 2023, the entirety of which is incorporated by reference herein.

BACKGROUND OF THE INVENTION

Field of the Invention

The present disclosure relates to an illumination module, and, in particular, to an illumination module that can be installed in a head-mounted display.

Description of the Related Art

The energy distribution of light beam in an illumination module is typically transformed using an integration rod or a micro lens array to create uniform lighting. Due to the relatively large size of the integration rod or the micro lens array, the volume of the illumination module must also be relatively large. In addition, before the light beam enters the integration rod or the micro lens array, it may be collected by a light-collecting element, such as a collimating lens, thereby increasing the overall volume of the illumination module, which reduces the applications in which the illumination module may be used. Therefore, the present disclosure provides an illumination module that is able to achieve miniaturization is provided.

BRIEF SUMMARY OF THE INVENTION

An illumination module is provided. The illumination module includes a light-emitting unit. The light-emitting unit includes a light-emitting element array and a focusing lens array. The light-emitting element array includes a plurality of light-emitting elements. The light-emitting elements are used for generating a plurality of light beams. The focusing lens array includes a plurality of focusing lenses. Each of the light-emitting elements corresponds to at least one of the focusing lenses.

A head-mounted display is provided. The head-mounted display includes a main part, an arm, an imaging device, and an optical waveguide. The main part includes a lens. The arm is connected to the main part. The imaging device is used for projecting an image to the lens. The imaging device includes an illumination module, a display module, and an imaging module. The illumination module includes a light-emitting unit. The light emitting unit includes a light-emitting array and a focusing lens array. The light-emitting element array includes a plurality of light-emitting elements used for generating a plurality of light beams. The focusing lens array includes a plurality of focusing lenses, and each of the light-emitting elements corresponds to at least one of the focusing lenses. The light beams generated by the illumination module pass through the display module and the imaging module sequentially. The light beams generated by the illumination module are transmitted to the optical waveguide and are propagated inside the optical waveguide.

A method for creating uniform lighting is provided. The method includes providing a light-emitting element array including a plurality of light-emitting elements for generating a plurality of light beams. The method also includes providing a focusing lens array including a plurality of focusing lenses. Each of the light-emitting elements corresponds to at least one of the focusing lenses.

BRIEF DESCRIPTION OF THE DRAWINGS

The present disclosure can be more fully understood by reading the detailed description and examples with references made to the accompanying drawings. It should be noted that various features may be not drawn to scale. In fact, the dimensions of the various features may be arbitrarily increased or decreased for clarity of discussion, and the various features may be drawn schematically.

DETAILED DESCRIPTION OF THE INVENTION

The following description provides many different embodiments, or examples, for implementing different features of the present disclosure. In addition, spatially relative terms may be used. For example, the formation of a first feature "on" and/or "above" a second feature in the description may include embodiments in which the first feature and the second feature are formed in direct contact, and may also include embodiments in which one or more additional feature formed between the first feature and the second feature, so that the first feature and the second feature may not be in direct contact. The spatially relative terms are intended to encompass different orientations of the devices in use or operation in addition to the orientation depicted in figures. The devices may be otherwise oriented (rotated 90 degrees or at other orientations), and the spatially relative descriptors used herein may likewise be interpreted accordingly.

In this specification, the terms "including", "comprising", "having", and the like should be interpreted as meaning "including but not limited to . . . ". Therefore, when the terms "including", "comprising", "having", and the like are used, the presence of corresponding features, regions, steps, operations and/or elements is specified, and without excluding the presence of other features, regions, steps, operations and/or elements. In addition, in this specification, the terms such as "about" and "substantially" are to be interpreted so as not to exclude insignificant deviation from the specified value and may include deviations of up to, 10%, 5%, 3%, 2%, 1%, 0.5%, etc.

Figure 1:
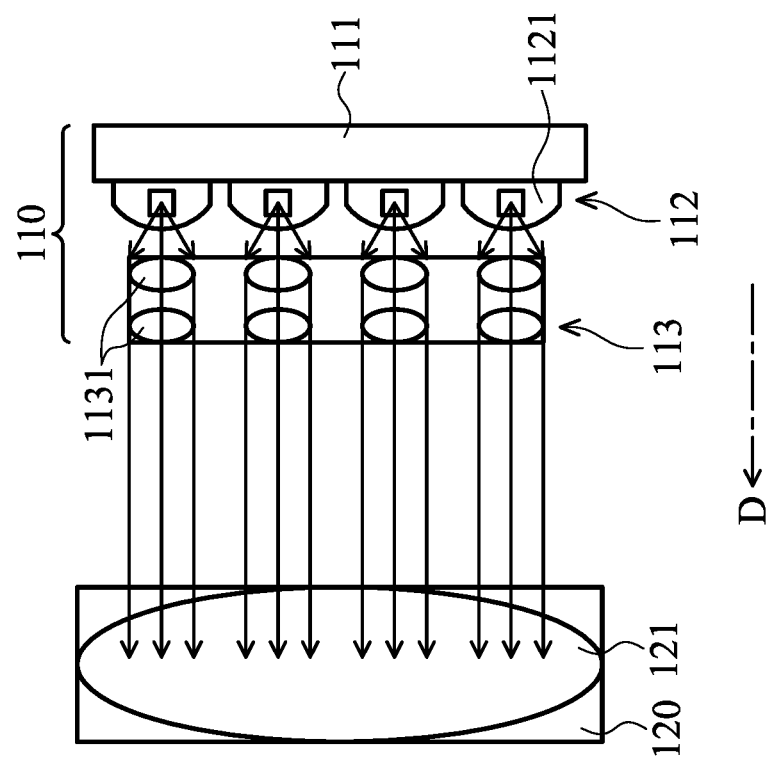
FIG. 1 is a schematic view of an illumination module, in accordance with some embodiments.

Please refer to FIG. 1. FIG. 1 is a schematic view of an illumination module 100, in accordance with some embodiments. The illumination module 100 includes a light-emitting unit 110 and a light-shape control unit 120 (for changing incident angle, illuminated area, or energy distribution of light). The light-emitting unit 110 includes a substrate 111, a light-emitting element array 112, and a focusing lens array 113. The light-shape control unit 120 includes a light-shape control element 121. In some embodiments, the light-emitting unit 110 may be disposed in a casing (not shown), so the light-emitting unit 110 is protected by the casing.

Figure 2:
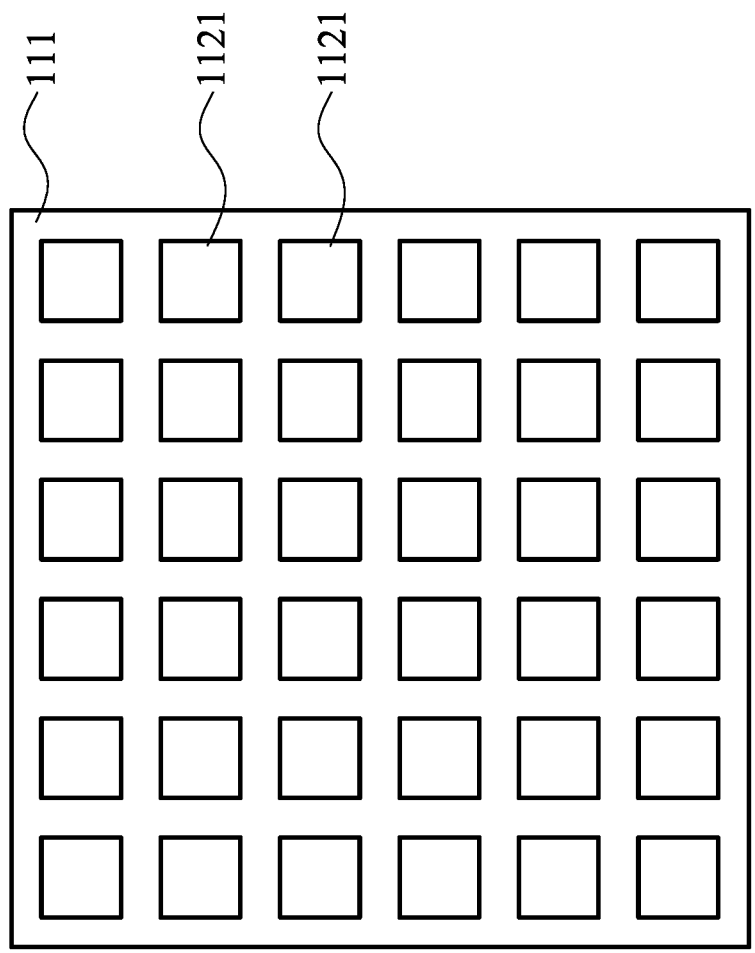
FIG. 2 is a schematic view of a light-emitting element array, in accordance with some embodiments.

In some embodiments, the substrate 111 may include an aluminum (Al) substrate, an aluminum nitride (AlN) substrate, silicon carbide (SiC), glasses, quartz, another suitable material, or a combination thereof, but the material of the substrate 111 is not limited thereto. In addition to FIG. 1, please also refer to FIG. 2 to understand the light-emitting element array 112. FIG. 2 is a schematic view of the light-emitting element array 112, in accordance with some embodiments. The light-emitting element array 112 includes a plurality of light-emitting elements 1121. In the embodiments illustrated in FIG. 2, there are 36 light-emitting elements 1121 that are arranged in six columns and six rows, but the quantity and arrangement of the light-emitting elements 1121 are not limited thereto. The light-emitting elements 1121 are disposed on the substrate 111. The light-emitting elements 1121 may be used for emitting light beams. For ease of illustration, the arrow is used in the drawings to represents the travel direction of light beams.

In some embodiments, the light-emitting elements 1121 include mini LEDs or micro LEDs. Compared to using LEDs, using mini LEDs or micro LEDs may decrease the volume of the light-emitting unit 110, thereby achieving miniaturization. In addition, mini LEDs or micro LEDs may have better performance in power consumption, brightness, contrast ratio, reliability, durability, etc.

Next, please refer to FIG. 1 to understand the focusing lens array 113. The focusing lens array 113 corresponds to the light-emitting element array 112. It should be noted that, in the specification, when an element is described as "corresponds to" or "corresponding to" another element, it means that the two elements at least partially overlap in the same direction D in which the light-emitting unit 110 and the light-shape control unit 120 (or, the light-shape control element 121) are arranged.

The focusing lens array 113 includes a plurality of focusing lenses 1131. The focusing lenses 1131 may be used for focusing the light beams generated by the light-emitting elements 1121. The focusing lenses 1131 may include optical elements such as convex lenses, concave lenses, etc. In some embodiments, each of the focusing lenses 1131 is the same. In some embodiments, the diameter of each of the focusing lenses 1131 is greater than 100 μm and less than 300 mm. In some embodiments, the distance between any two adjacent focusing lenses 1131 is greater than 10 μm and less than 1 mm.

Each of the light-emitting elements 1121 corresponds to at least one of the focusing lenses 1131. In some embodiments, when viewed from the direction D in which the light-emitting unit 110 and the light-shape control unit 120 are arranged, the center of each of the light-emitting elements 1121 substantially overlaps the center of the corresponding one of the focusing lenses 1131, and thus the focusing lenses 1131 may focus the light beams generated by the light-emitting elements 1121 in a better way.

In the embodiments illustrated in FIG. 1, the focusing lenses 1131 of the focusing lens array 113 are arranged in two rows in the direction D in which the light-emitting unit 110 and the light-shape control unit 120 are arranged, so each of the light-emitting elements 1121 corresponds to at least one or more than one focusing lens 1131 (for example, each of the light-emitting elements 1121 may correspond to two focusing lenses 1131). However, the focusing lenses 1131 of the focusing lens array 113 may be arranged in one-row or more than two-row.

When the number of rows of the focusing lenses 1131 of the focusing lens array 113 is increased, the focusing lenses 1131 may focus the light beams generated by the light-emitting elements 1121 in a better way. However, the multiple-row focusing lenses 1131 may increase the volume of the focusing lens array 113, so the focusing lens array 113 occupies more space. The quantity of focusing lenses 1131 of the focusing lens array 113 and the number of rows of focusing lenses 1131 of the focusing lens array 113 may be determined according to actual needs. In some embodiments, each of the light-emitting elements 1121 corresponds to at least one focusing lens 1131.

The light-shape control element 121 is able to control and change the light-shape of light beams, including but not limited to the incident angle, illuminated area, energy distribution, etc. The light-shape control element 121 may include one or more convex lens, one or more concave lens, etc. In addition, the light-shape control element 121 may have different curvature or material. In some embodiments, the type, number, curvature, material, and position of the light-shape control element 121 may be determined first, according to the desirable light type.

Figure 3:
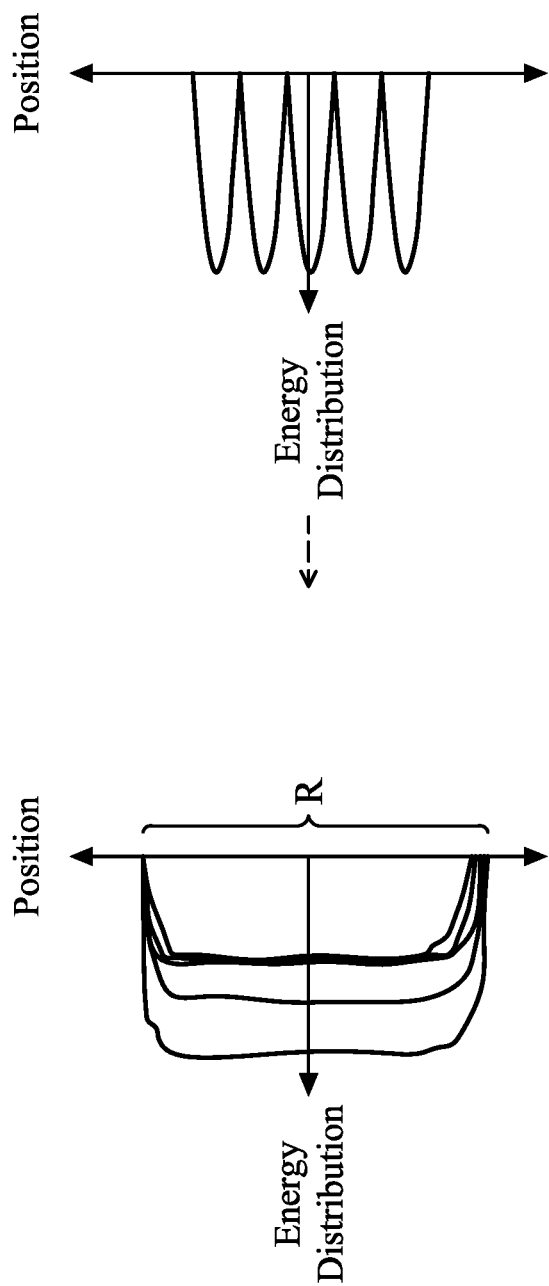
FIG. 3 illustrates the change in the energy distribution of light beams, in accordance with some embodiments.

Please refer to FIG. 3 to better understand how the light-shape control element 121 changes the energy distribution of light beams. FIG. 3 illustrates the change in the energy distribution of light beams, in accordance with some embodiments. The energy distribution of each of the light beams generated by the light-emitting elements 1121 through the corresponding focusing lens 1131 is a Gaussian distribution. If the energy distribution of light beams is not changed, images with uneven illumination would be generated, thereby influencing user experience.

The light-shape control element 121 may change or convert the energy distribution of each of the light beams into a flat-top distribution. Therefore, uniform lighting is created (homogenization), and each of the light beams is controlled to have a substantially equal illuminated area R. By superimposing all the changed energy distributions, in the illuminated area R, substantially uniform lighting (uniform energy distribution) is created. In some embodiments, the illuminated area R is determined based on the size of the display module 200 (which will be described below) or the size of image displayed in the display module 200, but the size of the illuminated area R is not limited thereto.

Figure 4:
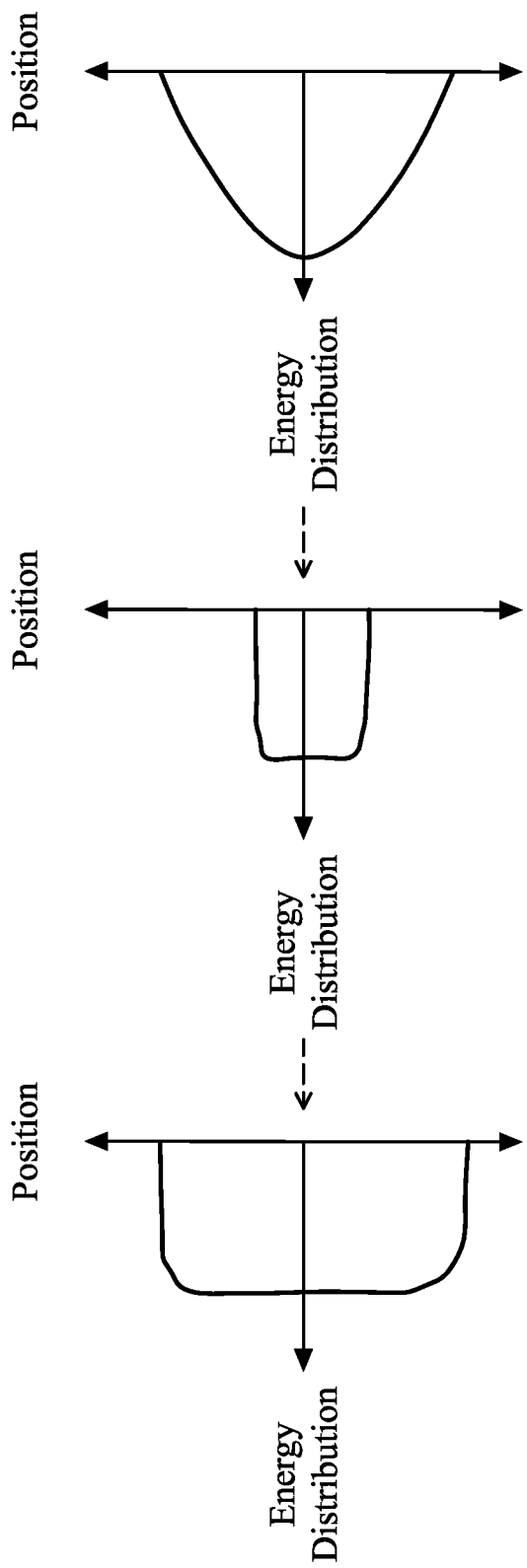
FIG. 4 and FIG. 5 illustrate the change in the energy distribution of light beams, which is different from FIG. 3, in accordance with some embodiments.
Figure 5:
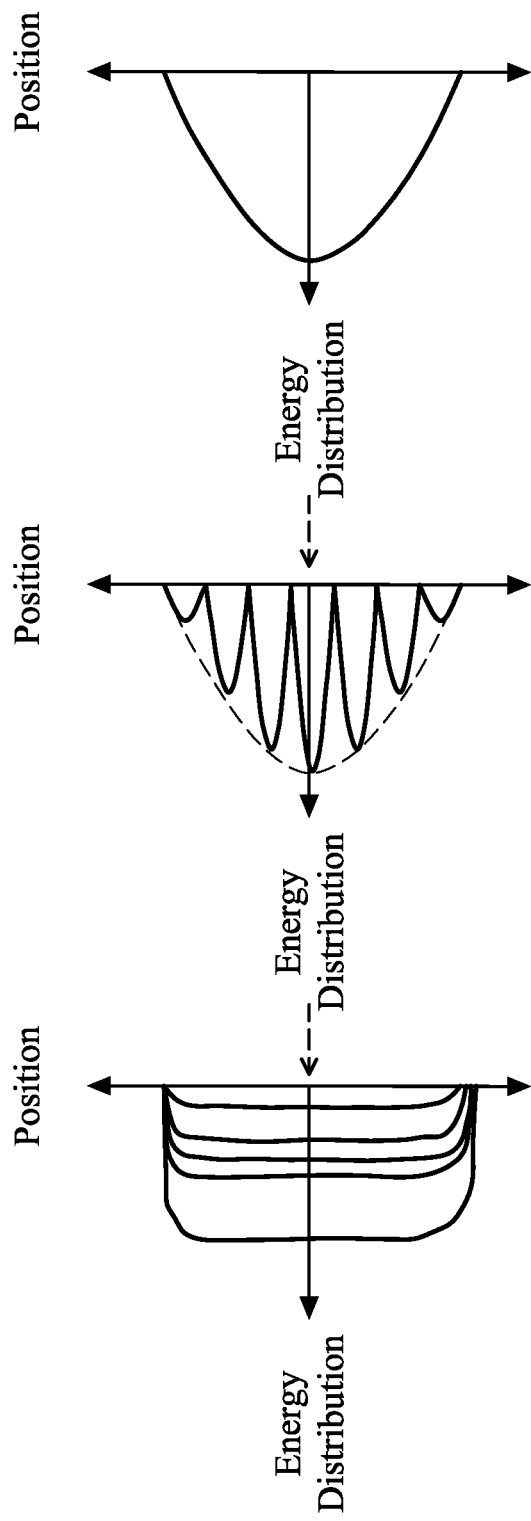

Next, please refer to FIG. 4 and FIG. 5 to understand prior art. FIG. 4 and FIG. 5 are used to illustrate the change in the energy distribution of light beams, which is different from FIG. 3. In FIG. 4 and FIG. 5, there is only one light-emitting element (such as an LED), and an integration rod or a micro lens array is used for creating uniform lighting, respectively. In FIG. 4, the light beam with a Gaussian distribution generated by the only one light-emitting element enters the integration rod, and the light beam is homogenized (uniform lighting) in a small area by the integrating rod.

In FIG. 5, the light beam with a Gaussian distribution generated by the only one light-emitting element enters the micro lens array, and the Gaussian distribution of the light beam is split into multiple Gaussian distributions by the micro lens array. Then, all the Gaussian distributions are converted into flat-top distributions by the light-shape control element.

On the contrary, in the present disclosure, each of the light beams generated by each of the light-emitting elements 1121 is individually collected by the focusing lens array 113, and a uniform energy distribution could be created by the light-shape control unit 120. Therefore, the converting of the energy distribution is simplified. In addition, compared to an illumination module including a light-collecting element, an integration rod, or a micro lens array, the volume of the illumination module 100 of the present disclosure is smaller, thereby achieving miniaturization. As a result, the illumination module 100 of the present disclosure may be used in a head-mounted display (such as a head-mounted display 1, which will be described below, or an existing head-mounted display) to have wide applications. At the same time, the head-mounted display equipped with the illumination module 100 of the present disclosure gets lighter, thereby improving user experience.

Figure 6:
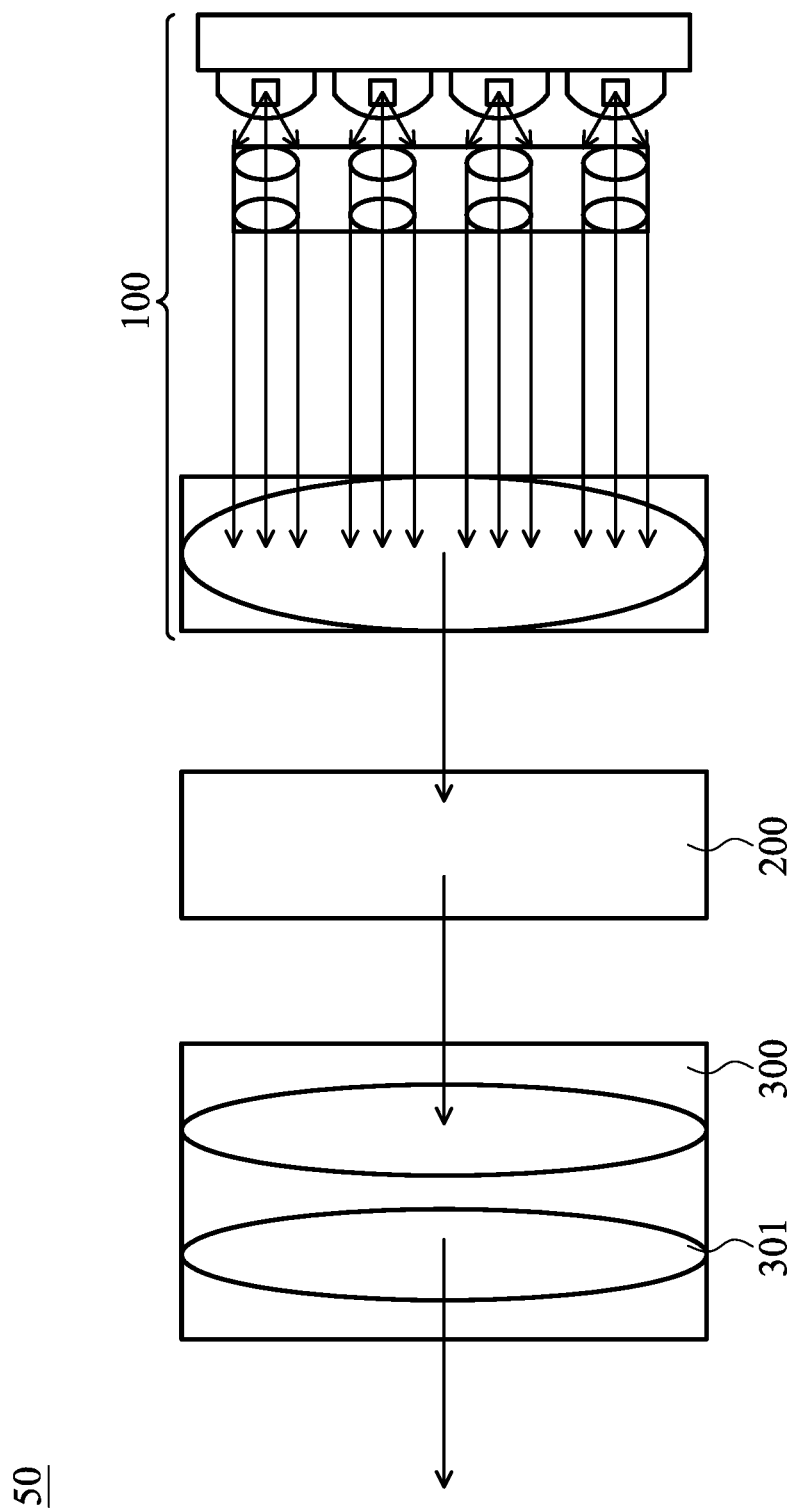
FIG. 6 is a schematic view of an imaging device including the illumination module, in accordance with some embodiments.

Next, please refer to FIG. 6. FIG. 6 is a schematic view of an imaging device 50 including the illumination module 100, in accordance with some embodiments. In addition to the illumination module 100, the imaging device 50 includes a display module 200 and an imaging module 300, and the light beams generated by the illumination module 100 passes through the display module 200 and the imaging module 300 sequentially. It should be noted that the arrangement of the illumination module 100, the display module 200, and the imaging module 300 may not be in a straight-line. In some embodiments, the imaging device 50 may include a prism for changing the travel direction of light beams. Since the travel direction of light beams may be arbitrarily changed, the positions of the display module 200 and/or the imaging module 300 may be arranged according to actual needs, thereby improving design flexibility.

The display module 200 may be used for displaying images. If the display module 200 includes color filters, the display module 200 may generate color images, and the light-emitting elements included therein may be white mini LEDs or white micro LEDs. Under such circumstances, all of the light-emitting elements 1121 may be in use in a constant current mode. If the display module 200 does not include any color filters, the display module 200 may not generate any color (image), and the light-emitting elements included therein may be RGB mini LEDs or RGB micro LEDs. Under such circumstances, the light-emitting elements 1121 may be in use in a pulse-width-modulation (PWM) mode for turning on the required ones.

In some embodiments, the images displayed in the display module 200 are greater than about 0.15 inches and less than 0.4 inches, but the sizes of the images displayed in the display module 200 are not limited thereto. Since it is difficult for a user to see the images, the imaging module 300 may be used to enlarge the images displayed in the display module 200. For example, the imaging module 300 may include one or more imaging element 301. The imaging element 301 may include an optical element such as a convex lens or a concave lens.

Figure 7:
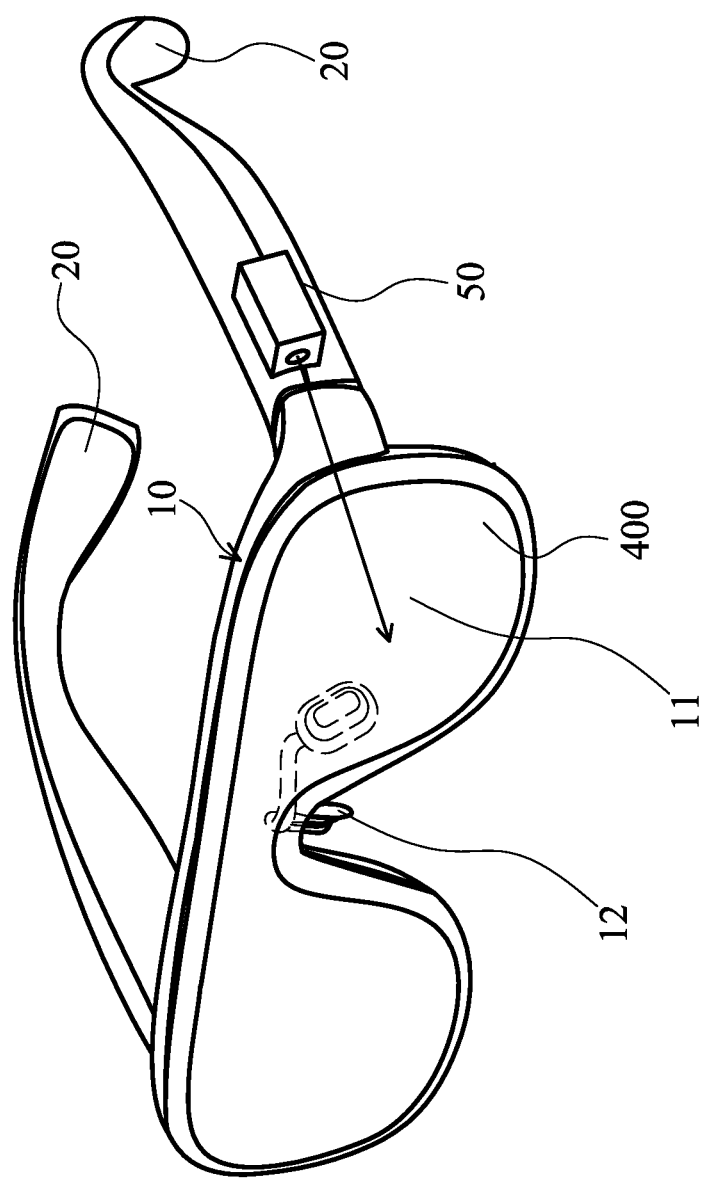
FIG. 7 is a schematic view of a head-mounted display including the imaging device, in accordance with some embodiments.

Next, please refer to FIG. 7. FIG. 7 is a schematic view of the head-mounted display 1 including the imaging device 50, in accordance with some embodiments. The head-mounted display 1 may be glasses using virtual reality (VR) techniques or augmented reality (AR) techniques. The head-mounted display 1 may include a main part 10 and two arms 20 (such as a left arm and a right arm). The arms 20 are connected to the main part 10. The main part 10 may include a lens 11 (or two separate lenses such as a left lens and a right lens) and optional two nose pads 12. When a user wears the head-mounted display 1, the main part 10 is in front of the eyes of the user, and the arms 20 are located on the two respective sides of the head of the user. The imaging device 50 may project images on the lens 11. In some embodiments, the imaging device 50 is disposed in the arms 20. In some embodiments, an optical waveguide 400 may be formed inside the lens 11.

Figure 8:
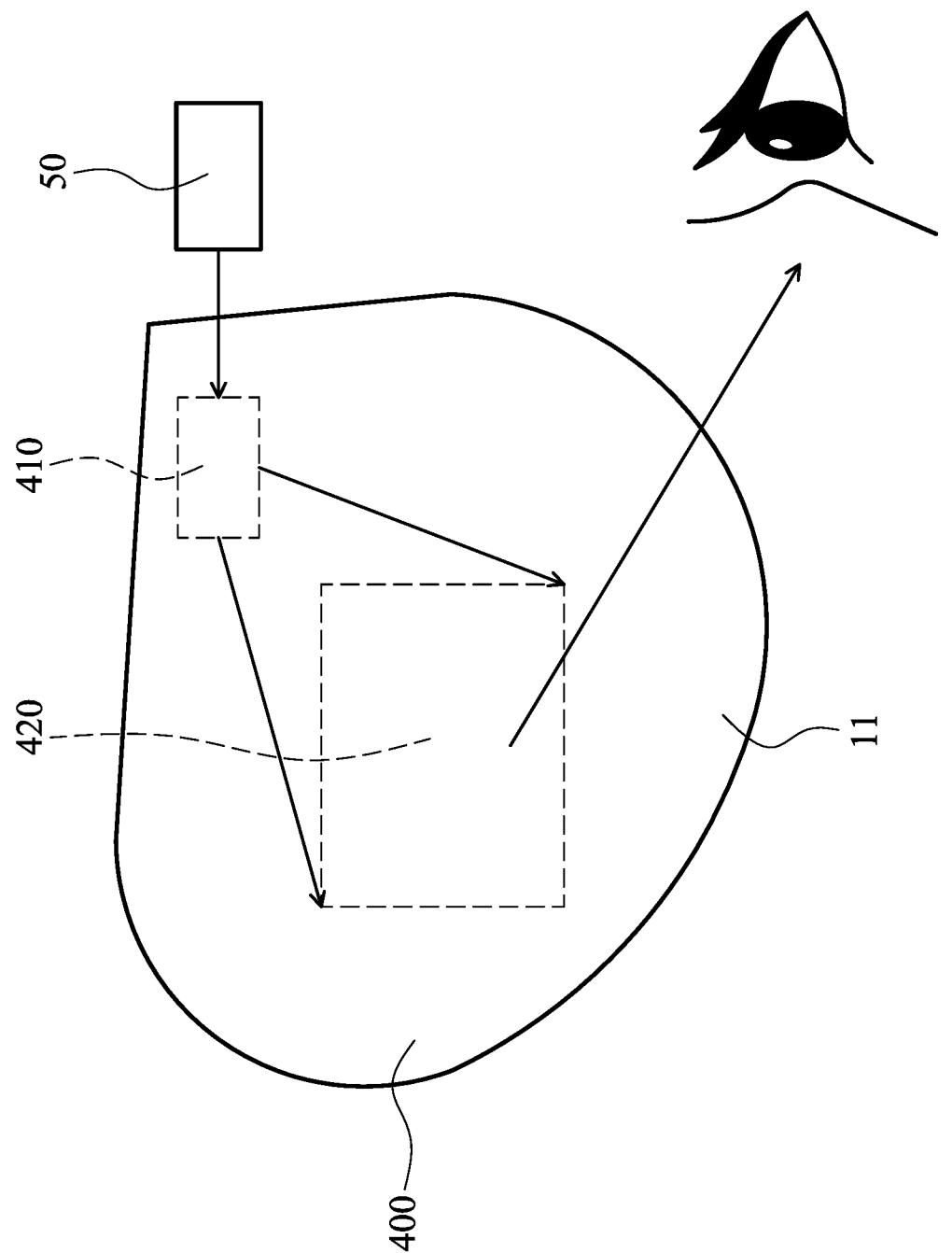
FIG. 8 and FIG. 9 are schematic views illustrating light paths of the light passing through an optical waveguide, in accordance with some embodiments.
Figure 9:
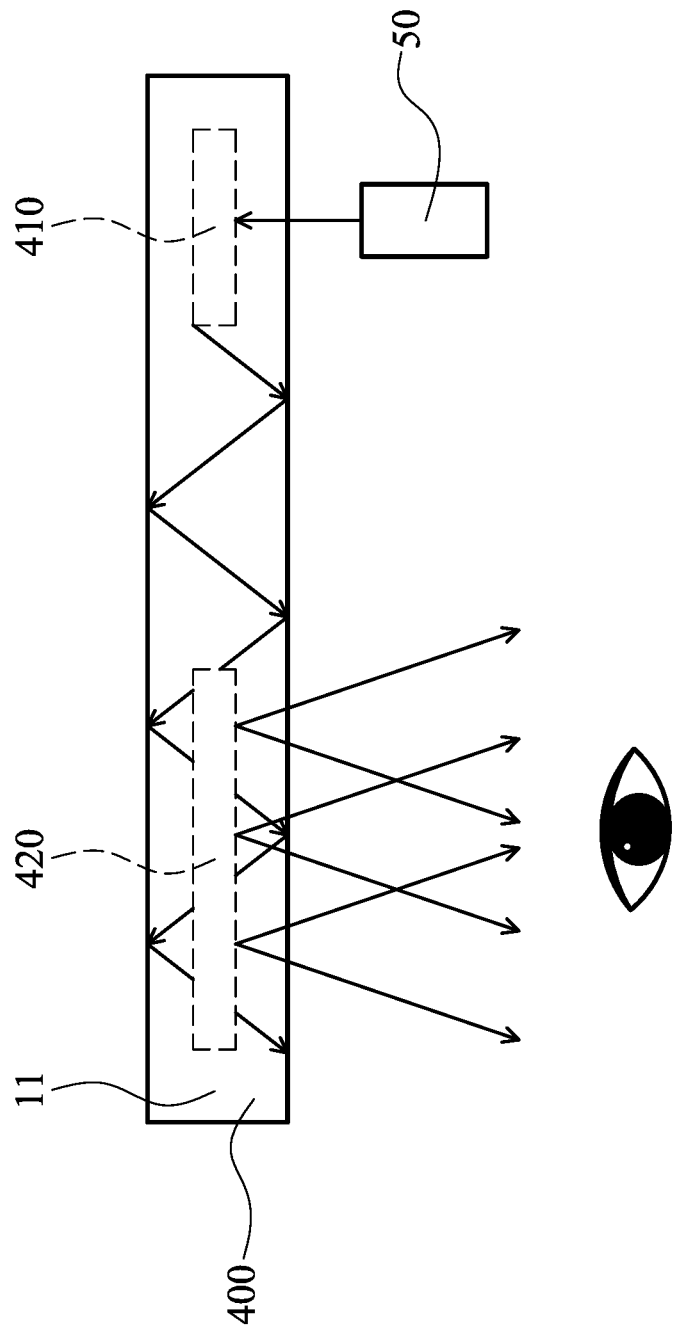

Next, please refer to FIG. 8 and FIG. 9 to understand the optical waveguide 400. FIG. 8 and FIG. 9 are schematic views illustrating light paths of the light beams passing through the optical waveguide 400, in accordance with some embodiments. The optical waveguide 400 may be designed to make the light beams propagated inside the optical waveguide 400 by total internal reflection (TIR) or diffraction, so the light beams may be propagated inside the optical waveguide 400 without losing energy. In the embodiments where the optical waveguide 400 is designed to make the light beams propagated inside the optical waveguide 400 by total internal reflection, the optical waveguide 400 may be a transmission media that has a larger refractive index than its surrounding material, and the incident angle of light entering the optical waveguide 400 is greater than the critical angle.

Figure 10:
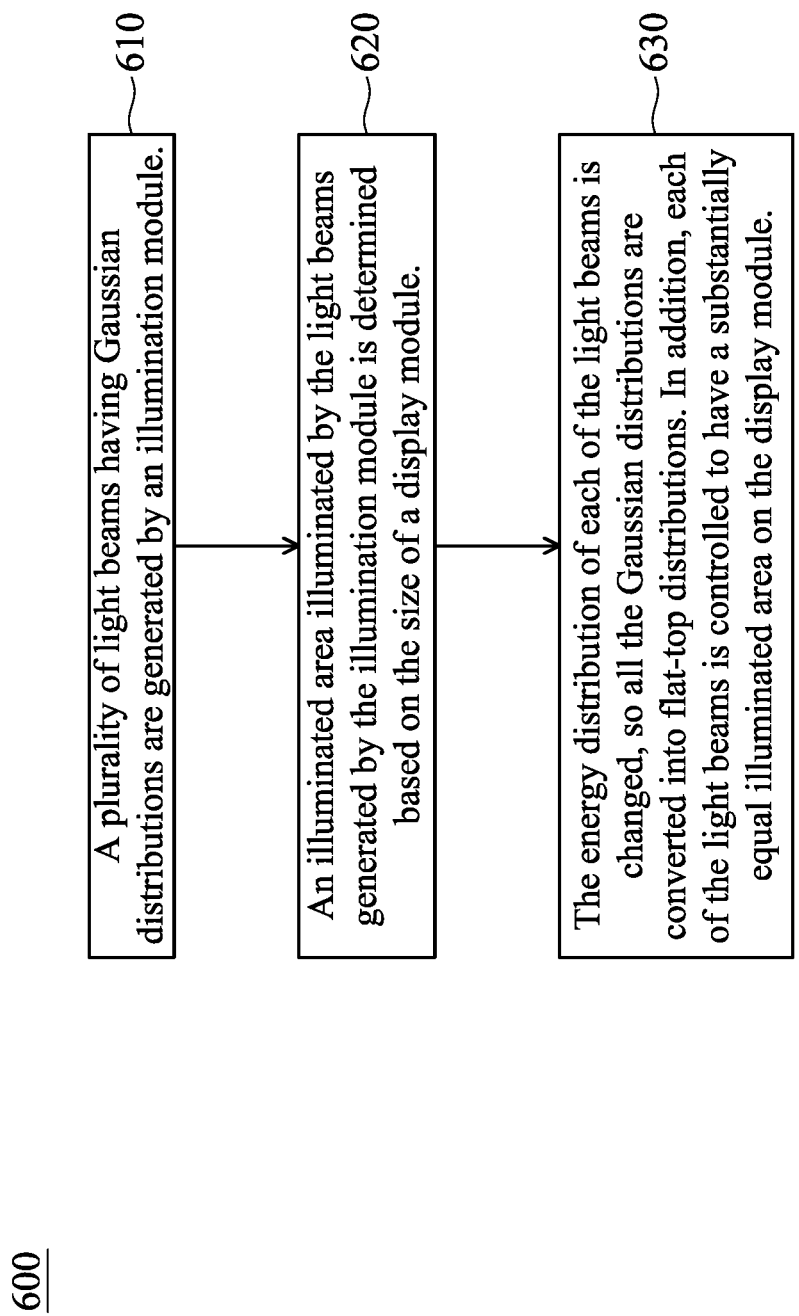
FIG. 10 is a flow chart of a method for creating uniform lighting, in accordance with some embodiments.

The optical waveguide 400 includes an optical waveguide entrance 410 and an optical waveguide exit 420. The optical waveguide exit 420 is farther away from the imaging device 50 than the optical waveguide entrance 410. The optical waveguide exit 420 is closer to the eyes of the user than the optical waveguide entrance 410. In some embodiments, the area of the optical waveguide exit 420 is larger than the area of the optical waveguide entrance. In particular, the light beams passing through the imaging module 300 may enter the optical waveguide 400 via the optical waveguide entrance 410 and leave the optical waveguide 400 via the optical waveguide exit 420, so the light beams may enter the eyes of the user without losing energy Next, please refer to FIG. 10. FIG. 10 is a flow chart of a method 600 for creating uniform lighting, in accordance with some embodiments. The method 600 includes an operation 610, an operation 620, and an operation 630. In the operation 610, a plurality of light beams having Gaussian distributions are generated by an illumination module. In operation 620, an illuminated area illuminated by the light beams generated by the illumination module is determined based on the size of a display module. In the operation 630, the energy distribution of each of the light beams is changed, so all the Gaussian distributions are converted into flat-top distributions. In addition, each of the light beams is controlled to have a substantially equal illuminated area on the display module, so superposition all the changed energy distributions in the illuminated area creates uniform lighting and generates images with even illumination.

As described above, an illumination module is provided. The illumination module includes an illumination unit and a light-shape control unit. The illumination unit includes a light-emitting element array and a focusing lens array. The light-emitting array includes a plurality of light-emitting elements, and the focusing lens array includes a plurality of focusing lenses. Each of the light-emitting elements corresponds to at least one of the focusing lenses. After each of the light beams generated by the respective light-emitting elements passes through the corresponding one of the focusing lenses, each of the light beams has a Gaussian distribution. The light-shape control unit includes a light-shape control element. The light-shape control element is able to change the energy distribution of each of the light beams, so each of the light beams has a flat-top distribution. In addition, the light-shape control element is able to control each of the light beams to have a substantially equal illuminated area. Therefore, uniform lighting may be created.

Each of the light beams generated by each of the light-emitting elements is individually collected by the focusing lens array, and a uniform energy distribution may be created by the light-shape control element. Therefore, the converting of the energy distribution is simplified. In addition, compared to an illumination module including a light-collecting element, an integration rod, or a micro lens array, the volume of the illumination module of the present disclosure is smaller, thereby achieving miniaturization. As a result, the illumination module of the present disclosure may be used in a heat-mounted display to have wide applications. At the same time, the heat-mounted display equipped with the illumination module of the present disclosure gets lighter, thereby improving user experience. Furthermore, the light-emitting elements used in the illumination module of the present disclosure may include mini LEDs or micro LEDs to achieve miniaturization further. Compared to using LEDs, using mini LEDs or micro LEDs may have better performance in power consumption, brightness, contrast ratio, reliability, durability, etc.

Besides, a method for creating uniform lighting is also provided. At first, a plurality of light beams having Gaussian distributions are generated. Then, all the Gaussian distributions are converted into flat-top distributions, and all the light beams are controlled to have a substantially equal illuminated area, so superposition of all of the changed energy distributions in the illuminated area creates uniform lighting and generates images with even illumination.

The foregoing outlines features of several embodiments, so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. In addition, the scope of the present disclosure is not limited to the specific embodiments described in the specification, and each claim constitutes a separate embodiment, and the combination of various claims and embodiments are within the scope of the disclosure.

What is claimed is:

1. An illumination module, comprising:
 a light-emitting unit, comprising:
 a light-emitting element array comprising a plurality of light-emitting elements, wherein the plurality of light-emitting elements are used for generating a plurality of light beams;
 a focusing lens array comprising a plurality of focusing lenses, wherein each of the plurality of light-emitting elements corresponds to at least one of the plurality of focusing lenses, and energy distribution of each of the plurality of light beams passing through the corresponding at least one of the plurality of focusing lenses is a Gaussian distribution; and
 a light-shape control element converting the energy distribution of each of the plurality of light beams into a flat-top distribution from the Gaussian distribution and controlling each of the plurality of light beams with the flat-top energy distribution to have a substantially equal illuminated area,
 wherein a uniform lighting is created by superimposing the flat-top distribution of each of the plurality of light beams within the substantially equal illuminated area.

2. The illumination module as claimed in claim 1, wherein the plurality of light-emitting elements comprise a mini LED or a micro LED.

3. The illumination module as claimed in claim 1, wherein the plurality of focusing lenses of the focusing lens array are arranged in two rows along the same direction in which the light-emitting unit and the light-shape control element are arranged.

4. A head-mounted display, comprising:
 a main part comprising a lens;
 an arm connected to the main part;
 an imaging device projecting an image to the lens, comprising:
 an illumination module, comprising:
 a light-emitting unit, comprising:
 a light-emitting element array comprising a plurality of light-emitting elements, wherein the plurality of light-emitting elements are used for generating a plurality of light beams;
 a focusing lens array comprising a plurality of focusing lenses, wherein each of the plurality of light-emitting elements corresponds to at least one of the plurality of focusing lenses, and energy distribution of each of the plurality of light beams passing through the corresponding at least one of the plurality of focusing lenses is a Gaussian distribution; and
 a light-shape control element converting the energy distribution of each of the plurality of light beams into a flat-top distribution from the Gaussian distribution and controlling each of the plurality of light beams with the flat-top energy distribution to have a substantially equal illuminated area,
 wherein a uniform lighting is created by superimposing the flat-top distribution of each of the plurality of light beams within the substantially equal illuminated area;
 a display module; and
 an imaging module; and
 an optical waveguide,
 wherein the plurality of light beams pass through the display module and the imaging module sequentially, and the plurality of light beams are transmitted to the optical waveguide and are propagated inside the optical waveguide.

5. The head-mounted display as claimed in claim 4, wherein the imaging module is disposed in the arm, and the optical waveguide is formed in the lens.

6. The head-mounted display as claimed in claim 4, wherein the display module comprises a color filter, and the plurality of light-emitting elements comprise a white mini LED or a white micro LED.

7. The head-mounted display as claimed in claim 4, wherein the plurality of light-emitting elements comprise an RGB mini LED or an RGB micro LED.

8. A method for creating uniform lighting, comprising:
 providing a light-emitting element array comprising a plurality of light-emitting elements, wherein the plurality of light-emitting elements are used for generating a plurality of light beams;

providing a focusing lens array comprising a plurality of focusing lenses, wherein each of the plurality of light-emitting elements corresponds to at least one of the plurality of focusing lenses, and energy distribution of each of the plurality of light beams passing through the corresponding at least one of the plurality of focusing lenses is a Gaussian distribution; and providing a light-shape control element that converts the energy distribution of each of the plurality of light beams into a flat-top distribution from the Gaussian distribution and controls each of the plurality of light beams with the flat-top energy distribution to have a substantially equal illuminated area, wherein a uniform lighting is created by superimposing the flat-top distribution of each of the plurality of light beams within the substantially equal illuminated area.

9. The method as claimed in claim 8, wherein the plurality of light-emitting elements comprise a mini LED or a micro LED.

10. The method as claimed in claim 8, wherein the substantially equal illuminated area illuminated by the plurality of light beams is determined based on a size of a display module.

\* \* \* \* \*